Feb. 20, 1945.    C. A. NERACHER ET AL    2,369,843
SYNCHROMESH TRANSMISSION
Filed May 27, 1943    2 Sheets-Sheet 1
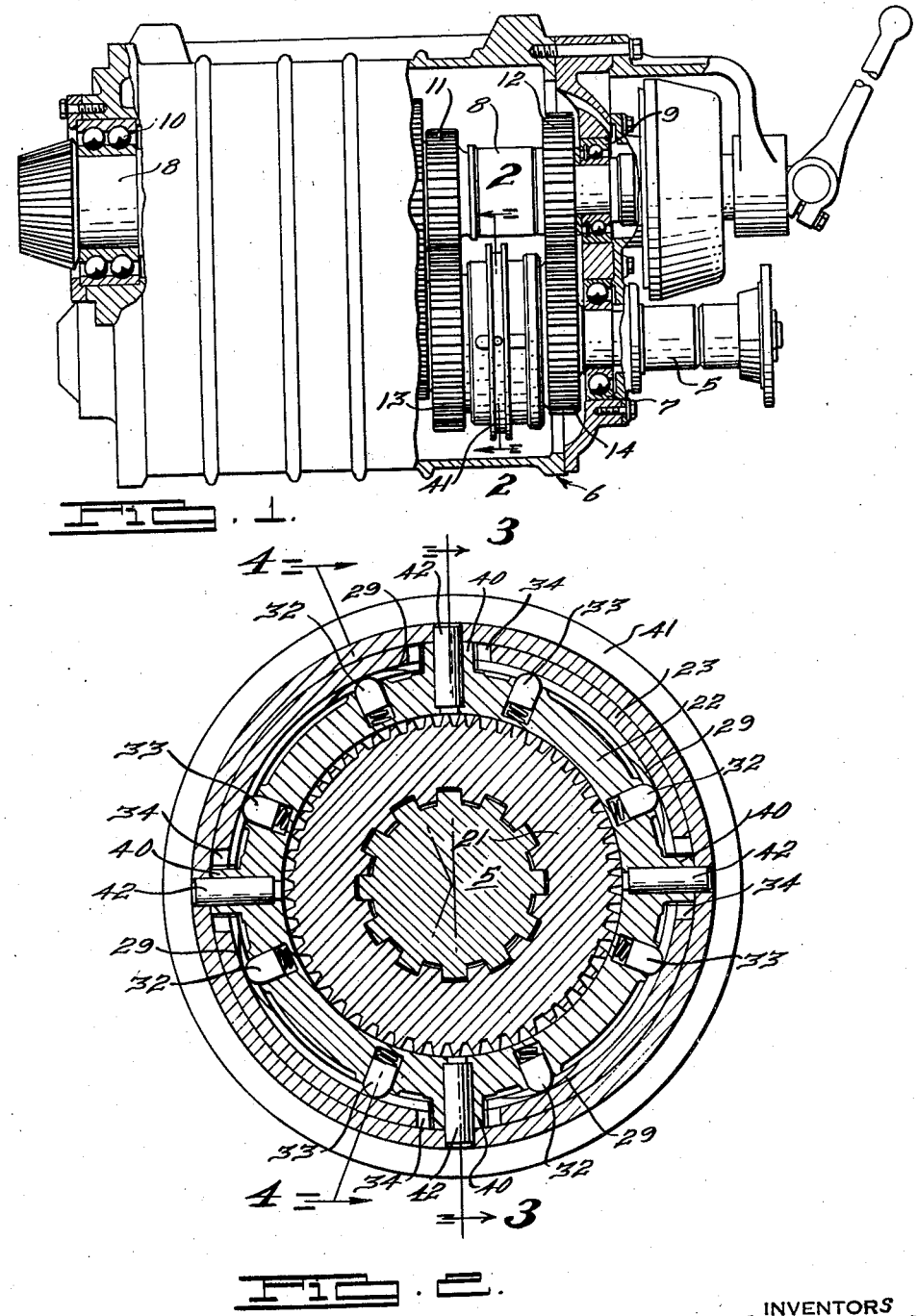
INVENTORS
Carl H. Neracher
BY William T. Dunn
Harness, Dickey, Pierce & Harris
ATTORNEYS

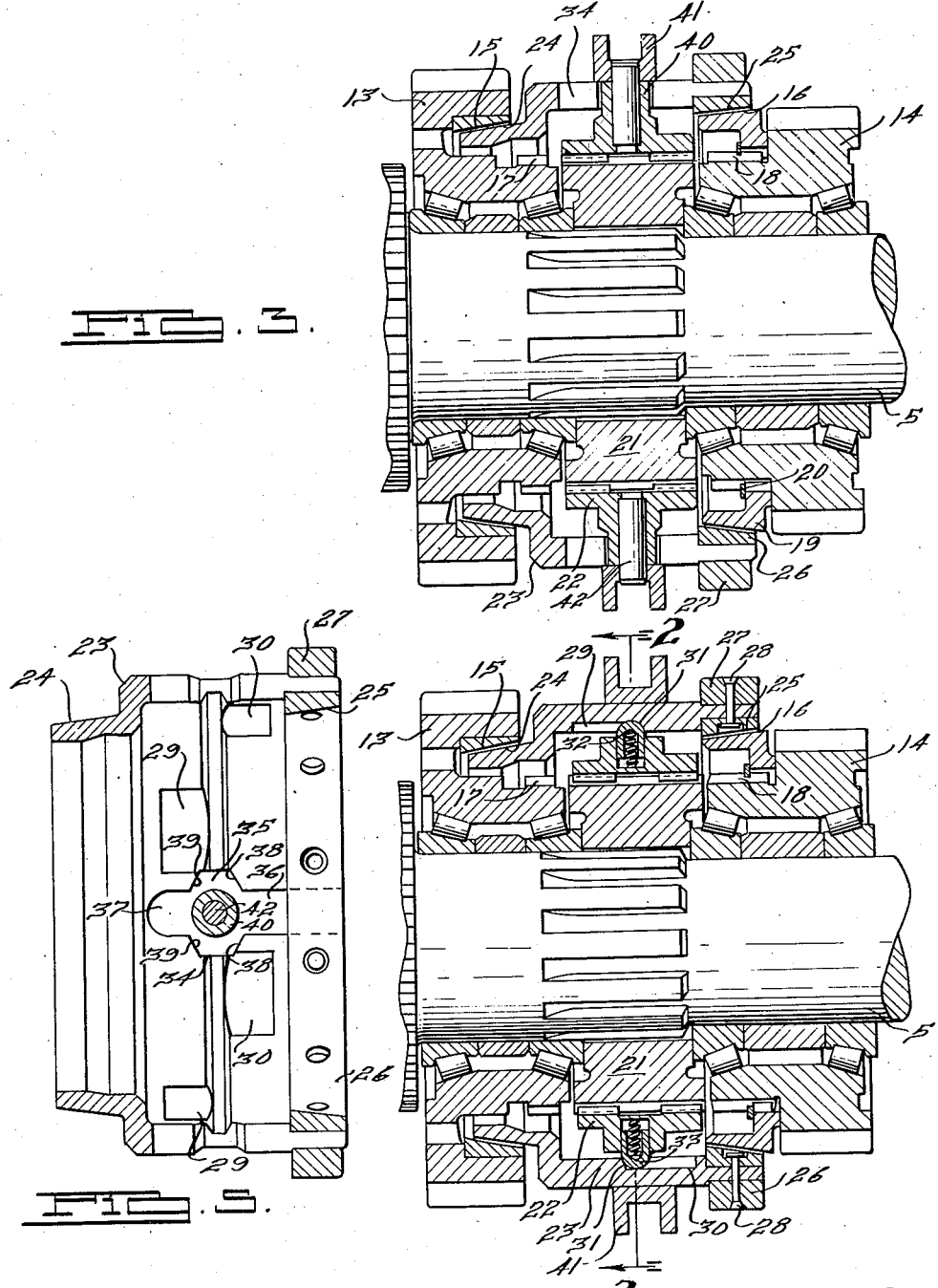

Patented Feb. 20, 1945

2,369,843

UNITED STATES PATENT OFFICE 2,369,843

SYNCHROMESH TRANSMISSION

Carl A. Neracher and William T. Dunn, Detroit, Mich., assignors to Chrysler Corporation, Highland Park, Mich., a corporation of Delaware Application May 27, 1943, Serial No. 488,688

5 Claims. (Cl. 192—53)

This invention relates to change speed transmissions and more particularly to improvements in synchromesh mechanisms for use therein.

An object of the invention is the provision of improvements in synchronous clutch mechanisms for blocking clutching action when the parts to be clutched are operating at different speeds and which will accommodate clutching when the parts are operating at approximately the same speed; and to provide a mechanism adapted to effect approximate synchronization of the parts to be clutched prior to the clutching engagement.

Another object of the invention is the provision of an improved mechanism which is bi-directional in its control of the parts adapted to be selectively clutched; and more specifically, the invention contemplates improvements in a power transmission comprising rotatable torque transmitting structures and a shiftable structure for selective positive clutching engagement therewith including a blocking section and a clutching section having an improved connection therebetween for shift of the sections as a unit to insure blocking of the clutching engagement when the structures to be clutched are operating in an asynchronous relation and allowing the clutching engagement when such structures are operating in asynchronous relation.

Other objects of the invention will be more apparent from the following description taken in connection with the accompanying drawings, in which:

Fig. 1 is a side elevational view, partly in section, of a change speed power transmission embodying the invention.

Fig. 2 is an enlarged transverse section taken as indicated by the line 2—2 of Fig. 1.

Figs. 3 and 4 are sectional views taken as indicated by the lines 3—3 and 4—4, respectively, of Fig. 2.

Fig. 5 is a longitudinal sectional view of the blocker member shown in Figs. 1 to 4 and illustrating the connection thereof with the clutching sleeve.

Referring to the drawings, the invention is illustrated in connection with a power transmission of the type having a plurality of speed ratio drives. The transmission illustrated in Fig. 1 includes an input shaft 5 journaled in a casing structure 6 by bearing units, one of which is shown at 7, and adapted to be driven by a power unit, preferably through the medium of a clutch, not shown. An output shaft 8 is journaled in the casing 6, as at 9 and 10, and has a plurality of driven gears, including the gears 11 and 12 of relative different diameters rotatable therewith and respectively in constant mesh with driving gears 13 and 14 of relatively different diameters which are rotatably journaled on the shaft 5 as more particularly shown in Fig. 3.

The invention is illustrated in connection with the means for selectively drivingly connecting the gears 13 and 14 with the input shaft 5 for transmitting different speed ratio drives to the output shaft 8. The gear 13 has an internal friction face 15 in the form of a portion of a cone and the gear 14 has a similar friction face 16. Corresponding sets of clutch teeth 17 and 18 are rotatably carried by the gears 13 and 14, respectively. The friction face 16 is formed on the external surface of an annulus 19 which has internal teeth meshing with the clutch teeth 18 and which is retained in abutting relation with the gear 14 by a snap spring 20 seated in an annular groove in the teeth 18, all as shown more particularly in Fig. 3. Splined on the shaft 5 is an axially stationary hub 21 having external teeth meshing with teeth of a sleeve 22, as shown in Figs. 2 and 3, the sleeve 22 being adapted for axial shift to selectively positively clutch the teeth thereof with the sets of teeth 17 and 18.

A blocking and synchronizing section is rotatably connected with the clutching sleeve 22, as will more fully be set forth, and includes the annular member 23 having an external friction face 24 in the form of a portion of a cone registering with the face 15 of the gear 13 and an internal friction face 25 in the form of a portion of a cone registering with the face 16 rotatable with the gear 14, the face 25 being carried by an annulus 26. An external reinforcing annulus 27 encircles the member 23 in registration with the annulus 26, the two annuli being riveted to the member 23 as indicated at 28.

A releasable connection is provided between the sleeve 22 and member 23 and for this purpose the internal periphery of the member 23 has a first set of four axially extending grooves 29 as shown in Fig. 2, and a second set of four axially extending grooves 30, corresponding to the grooves 29, arranged alternately circumferentially with the grooves 29, as shown more particularly in Fig. 5. Each groove of the two sets is arcuately contoured circumferentially of the member 23 as shown in Fig. 2 and each of the grooves 29 has an inclined abutment forming end wall 31 and each of the grooves 30 has a similar wall 31', as shown in Fig. 4. The sleeve 22 has a plurality of radially outwardly projecting spring-pressed detents, those identified by the numeral 32 respectively registering with the grooves 29 and those identified by the numeral 33 respectively registering with the grooves 30. The grooves 30 are of such length that the detents 33 remain therein when the sleeve 22 is clutched with the teeth 18 and the grooves 29 contain the detents 32 when the sleeve 22 is clutched with the teeth 17, only very slight opposition to relative shift of the sleeve 22 and member 23 being offered by the detents during movement thereof in the respective grooves.

The blocking member 23 has a plurality, four in number, of circumferentially spaced axially extending slots generally indicated by the numeral 34, each including an enlarged neutral zone 35 and opposite axially extending portions 36 and 37, a pair of ramp-like walls 38 at the entrance of the portion 36, and a similar pair of walls 39 at the entrance of the portion 37, as shown more particularly in Fig. 5.

The sleeve 22 has four radially outwardly extending projections 40 respectively disposed in the slots 34 with clearance therewith to accommodate relative rotation of the sleeve 22 and member 23. The sleeve has four radial openings respectively registering with openings in a channeled shift collar 41 for receiving a connecting pin 42. The projections 40 in cooperation with the slots 34 form a rotatable connection between the sleeve 22 and member 23, which connection due to the clearance between the projections and slots accommodates relative rotation of the sleeve 22 and member 23 when the projections are in the respective neutral zones 35, as shown in Fig. 5.

In the operation of the mechanism it will be understood that the output shaft 8 will be driven at relatively different speeds with respect to the input shaft 5 by selectively clutching the sleeve 22 with the grooves 13 and 14. The sleeve 22 is shown in its neutral position and as a typical example of the operation of the mechanism let it be assumed that the shaft 8 is to be driven from the shaft 5 through the gears 12 and 14. The shaft 5 is declutched from the engine drive and the sleeve 22 is shifted to the right as viewed in Fig. 3 under an asynchronous condition with respect to the gear 14 and sleeve 22.

In response to such shift the detents 32 acting against the abutments 31 shift the member 23 with the sleeve 22 to engage the friction faces 16 and 25 and due to the aforesaid synchronous condition the member 23 and sleeve 22 are subjected to relative rotation so that one or the other of the ramp-like walls 38 of each slot 34 is engaged by the associated projection 40 to block movement of the latter into the slotted portion 36 and thus momentarily interrupt the clutching shift. The pressure applied to the engaged ramp by reason of the shift will force the face 25 into frictional driving engagement with the face 16 to thereby produce a synchronous condition with respect to the sleeve 22 and gear 14 whereupon the member 23 and sleeve 22 are subjected to relative rotation by the shifting force to thereby relatively align the projections 40 and the respective slot portions 36 for movement of the former into the latter, the detent connection releasing the member 23 from the sleeve 22 by movement of the detents 32 out of their respective grooves 29 for relative axial shift of the sleeve 22 to clutch with the teeth 18. During the foregoing operation the detents 33 remain in their respective grooves 30.

When the sleeve 22 is then shifted to the left, the member 23 will be carried therewith and the detents 32 returned to their respective grooves 29. Should the latter shift continue to a position to clutch the sleeve with the teeth 17 of the gear 13, the detents 33 will engage the abutments 31' to shift the member 23 with the sleeve 22, thus insuring movement of the member 23 to a blocking position as set forth above in connection with the shift to clutch the sleeve 22 with the teeth 18.

The illustrated arrangement insures that engagement of the detents with the member 23 necessary for shifting the latter with the sleeve to obtain the blocking action and overcomes difficulties heretofore experienced with releasable connections of this type wherein the detents by reason of a relatively fast shift fail to properly seat in the groove therefor and as a consequence of this failure, the member 23 is not shifted to obtain the blocking action.

Although but one embodiment of the invention is herein shown and described, it will be understood that various changes in the size, shape and arrangement of parts may be made without departing from the spirit of our invention and it is not our intention to limit said invention other than by the terms of the appended claims.

We claim:

1. In a power transmission mechanism, the combination of relatively rotatable torque transmitting structures each having a set of clutch teeth and a friction face rotatable therewith, a toothed body adapted for axial opposite shift to selectively clutch with said sets of clutch teeth, a blocker member rotatably connected with said toothed body for movement relative thereto between first and second positions respectively blocking and allowing said clutching shift, said member having friction faces respectively registering with the first friction faces and being axially oppositely shiftable to engage a pair of said registering faces to thereby effect said movement of said member, said member having a first set of axially extending grooves and an abutment at adjacent ends thereof and said toothed body having a first set of detents respectively movable in said grooves during clutching shift of the toothed body in one direction and engageable with said abutment during clutching shift of said toothed body in its other direction to thereby shift said member in one of its directions as aforesaid, said member having a second set of axially extending grooves and an abutment at adjacent ends of the latter and said toothed body having a second set of detents respectively movable in the grooves of the second set during clutching shift of said toothed body in said other direction and engageable with the last mentioned abutment during clutching shift of said toothed body in said one direction to thereby shift said member in its other direction.

2. In a power transmission mechanism, the combination of relatively rotatable torque transmitting structures each having a set of clutch teeth and a friction face rotatable therewith, a toothed body adapted for axial opposite shift to selectively clutch with said sets of clutch teeth, a blocker member rotatably connected with said toothed body for movement relative thereto between first and second positions respectively blocking and allowing said clutching shift, said member having friction faces respectively registering with the first friction faces and being axially oppositely shiftable to engage a pair of said registering faces to thereby effect said movement of said member, a plurality of detents shiftable with said toothed body releasably connecting said member with the latter for limited shift therewith, said member having a plurality of axially extending grooves respectively registering with said detents, said grooves and said detents being so arranged that certain of said detents remain in their respective registering grooves and other of said detents are moved out of their respective registering grooves during clutching shift of said toothed body in either of its directions.

3. In a power transmission mechanism, the combination of relatively rotatable torque transmitting structures each having a set of clutch teeth and a friction face rotatable therewith, a toothed body adapted for axial opposite shift to selectively clutch with said sets of clutch teeth, a blocker member rotatably connected with said toothed body for movement relative thereto between first and second positions respectively blocking and allowing said clutching shift, said member having friction faces respectively registering with the first friction faces and being axially oppositely shiftable to engage a pair of said registering faces to thereby effect said movement of said member, a plurality of detents shiftable with said toothed body releasably connecting said member with the latter for limited shift therewith, said member having axially spaced shoulders and axially extending relieved portions respectively communicating with said shoulders, certain of said detents engaging one of said shoulders when said toothed body is shifted in one of its directions and being confined to the relieved portion communicating with said one shoulder when said toothed body is shifted in the other of its directions and the other of said detents engaging the other of said shoulders when said toothed body is moved in said other direction and being confined to the other of said relieved portions when said toothed body is shifted in said one direction.

4. In a power transmission mechanism, the combination of relatively rotatable torque transmitting structures each having a set of clutch teeth and a friction face rotatable therewith, a toothed body adapted for axial opposite shift to selectively clutch with said sets of clutch teeth, a blocker member associated with said toothed body for movement relative thereto between first and second positions respectively blocking and allowing said clutching shift, said member having friction faces respectively registering with the first friction faces and being axially oppositely shiftable to engage a pair of said registering faces to thereby effect said movement of said member, and a plurality of detents carried by said toothed body releasably connecting said member thereto for limited shift therewith, said member having a plurality of reliefs respectively associated with said detents such that certain of said detents remain in the relief associated therewith and the other of the detents are displaced from the relief associated therewith when said toothed body is clutched with one of said sets of clutch teeth.

5. In a power transmission mechanism, the combination of relatively rotatable torque transmitting structures each having a set of clutch teeth and a friction face rotatable therewith, a clutching section adapted for axial opposite shift to selectively clutch with said sets of clutch teeth, a blocker section associated with said clutching section for movement relatively thereto between first and second positions respectively blocking and allowing said clutching shift and having friction faces respectively registering with and adapted to engage the first friction faces to effect said movement of said blocking section, and a plurality of detents shiftable with one of said sections and acting on the other thereof releasably connecting said blocker section with said clutching section for limited shift therewith to thereby engage said registering friction faces as aforesaid, said other section having a plurality of reliefs respectively associated with said detents such that certain of said detents remain in the relief associated therewith and the other of the detents are displaced from the relief associated therewith when said clutching section is clutched with one of said sets of clutch teeth.

CARL A. NERACHER.
WILLIAM T. DUNN.